US011232696B1

(12) United States Patent
Hong et al.

(10) Patent No.: US 11,232,696 B1
(45) Date of Patent: Jan. 25, 2022

(54) PREPARATION OF CONCEALED MARKS WITH CORE-SHELL LUMINOPHORES FOR CUSTOMS SECURITY CHECK SYSTEM AND APPLICATION THEREOF

(71) Applicants: Jinling Haiguan Technical Center, Nanjing (CN); Jiangsu Yangtze Testing and Certification Co., Ltd., Nanjing (CN)

(72) Inventors: Ying Hong, Nanjing (CN); Rong Gao, Nanjing (CN); Jinling Wang, Nanjing (CN); Guosong Chen, Nanjing (CN); Yuanyuan Zhu, Nanjing (CN); Jing Fang, Nanjing (CN); Ling Gao, Nanjing (CN); Weijian Shen, Nanjing (CN); Wei An, Nanjing (CN); Jiansong Chen, Nanjing (CN)

(73) Assignees: JINLING HAIGUAN TECHNICAL CENTER, Nanjing (CN); JIANGSU YANGTZE TESTING AND CERTIFICATION CO., LTD., Nanjing (CN)

( * ) Notice: Subject to any disclaimer, the term of this patent is extended or adjusted under 35 U.S.C. 154(b) by 0 days.

(21) Appl. No.: 17/389,590

(22) Filed: Jul. 30, 2021

(30) Foreign Application Priority Data

Feb. 7, 2021 (CN) .......................... 2021101687444

(51) Int. Cl.
*G08B 21/18* (2006.01)
*C09K 11/77* (2006.01)
(Continued)

(52) U.S. Cl.
CPC .............. *G08B 21/18* (2013.01); *C09D 5/22* (2013.01); *C09K 11/7773* (2013.01); *G01V 8/10* (2013.01);
(Continued)

(58) Field of Classification Search
CPC ..................................................... G08B 21/18
See application file for complete search history.

(56) References Cited

U.S. PATENT DOCUMENTS 6,630,121 B1 * 10/2003 Sievers ............... H01J 37/3007
424/1.13
2010/0227181 A1 * 9/2010 Kitamura ................. C09D 5/22
428/457
(Continued)

FOREIGN PATENT DOCUMENTS

CN   101812299 A   8/2010
CN   106281305 A   1/2017
(Continued)

OTHER PUBLICATIONS

CN Search Report dated Feb. 7, 2021 in Chinese application No. 202110168744.4.
(Continued)

*Primary Examiner* — Travis R Hunnings
(74) *Attorney, Agent, or Firm* — McClure, Qualey & Rodack, LLP

(57) ABSTRACT

Concealed mark preparation with core-shell luminosphores for customs security check system and application thereof, to address that infrared luminescent materials have not been used in senseless customs clearance field, absorption cross sections of infrared luminescent materials currently available are not big enough, and upconversion luminescence intensity thereof is low, consequently, the luminescent marks are not clear enough to recognize marked abnormal luggage, and provide a following solution: step 1: preparing $TiQ_2$; step 2: preparing $Ag@TiO_2$ composite nanoparticles; step 3: preparing $Ag@TiQ_2@NaYF_4:Yb^{3+}, Er^{3+}$ luminescent nanoparticles; step 4: making concealed luggage marks. $Ag@TiQ_2@NaYF_4:Yb^{3+}, Er^{3+}$ luminescent nanoparticles according to the present invention has superior luminescent (Continued)

intensity than pure $NaYF_4:Yb^{3+}$, $Er^{3+}$, and luminescent materials prepared in this method can be disseminated in organic solution such as ethanol and methanol for use in preparing concealed marks to mark susceptible luggage and provides a research direction for senseless, intelligent and safe customs clearance.

4 Claims, 1 Drawing Sheet

(51) Int. Cl.
    *C09D 5/22*      (2006.01)
    *G01V 8/10*      (2006.01)
    *G08B 27/00*      (2006.01)
    *G06K 9/00*      (2006.01)
    *G06K 7/10*      (2006.01)
    *B82Y 15/00*      (2011.01)
    *B82Y 40/00*      (2011.01)
    *B82Y 20/00*      (2011.01)

(52) U.S. Cl.
    CPC ..... *G06K 7/10297* (2013.01); *G06K 9/00288* (2013.01); *G06K 9/00771* (2013.01); *G08B 27/001* (2013.01); *B82Y 15/00* (2013.01); *B82Y 20/00* (2013.01); *B82Y 40/00* (2013.01)

(56) References Cited

U.S. PATENT DOCUMENTS

2020/0354220 A1* 11/2020 Pedersen .................. C04B 35/10
2021/0230381 A1* 7/2021 Lundorf .................. C04B 35/10

FOREIGN PATENT DOCUMENTS

| CN | 107185565 A | 9/2017 |
| CN | 107384402 A | 11/2017 |
| CN | 111778029 A | 10/2020 |
| GN | 107185565 A | 9/2017 |
| GN | 111778029 A | 10/2020 |

OTHER PUBLICATIONS

English translation of CN Search Report dated 2021-02-07 in Chinese application No. 202110168744.4.
CN Office Action dated Mar. 25, 2021 in Chinese application No. 202110168744.4.
English translation of CN Office Action dated Mar. 25, 2021 in Chinese application No. 202110168744.4.
Chinese language claim replacement sheet (clean copy) accompanying response to first office action in Chinese application No. 202110168744.4.
English translation of claim replacement sheet (clean copy) accompanying response to first office action in Chinese application No. 202110168744.4.
Chinese language amendment/response to first office action filed in Chinese application No. 202110168744.4.
English translation of amendment/response to first office action filed in Chinese application No. 202110168744.4.
CN Office Action dated Apr. 21, 2021 in Chinese application No. 202110168744.4.
Chinese language claim replacement sheet (clean copy) accompanying response to second office action in Chinese application No. 202110168744.4.
English translation of claim replacement sheet (clean copy) accompanying response to second office action in Chinese application No. 202110168744.4.
Chinese language amendment/response to second office action filed in Chinese application No. 202110168744.4.
English translation of amendment/response to second office action filed in Chinese application No. 202110168744.4.
Notice of Allowance dated May 11, 2021 in Chinese application No. 202110168744.4.
English translation of Notice of Allowance dated May 11, 2021 in Chinese application No. 202110168744.4.
Ding, et al.: "Plasmonic enhanced upconversion luminescence of β-NaYF4:Yb3+/Er3+ with Ag@SiO2 core-shell nanoparticles"; Journal of Luminescence 147 (2014) pp. 72-76.
Gao, et al.: "Synergistic effect of upconversion and plasmons in NaYF4:Yb3+, Er3+, Tm3+@TiO2—Ag composites for MO photodegradation"; RSC Advances; 2017, 7, pp. 54555-54561.

* cited by examiner

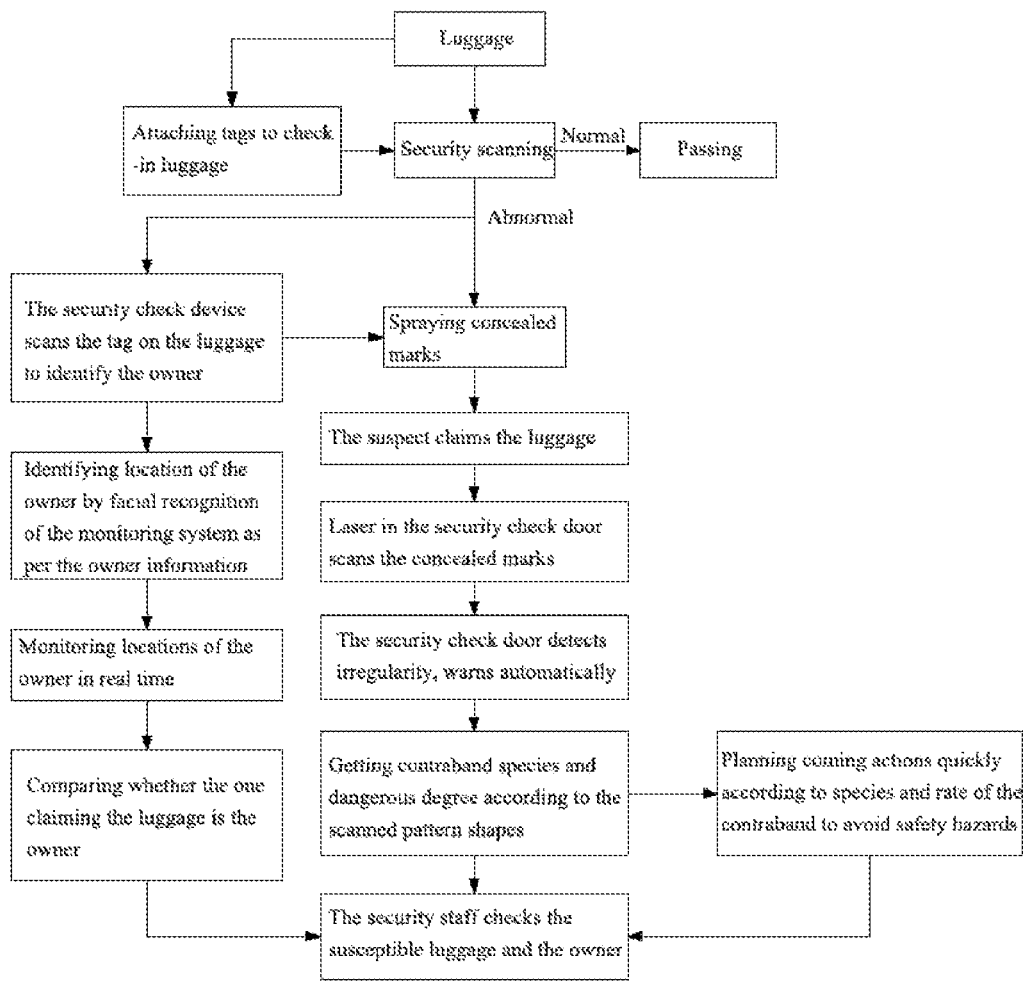

PREPARATION OF CONCEALED MARKS WITH CORE-SHELL LUMINOPHORES FOR CUSTOMS SECURITY CHECK SYSTEM AND APPLICATION THEREOF

TECHNICAL FIELD

The present invention relates to the marking technical field, especially preparation of concealed marks with core-shell luminophores for customs security check system and application thereof.

BACKGROUND TECHNOLOGY

With high speed economic development, entry and exit traffic at the customs is gradually rising, which brings more customs clearance work and increasingly outstanding safety hazards. Aiming at getting rid of monitoring, tax evasion and seeking exorbitant profits, smuggling has disturbed economic orders, jeopardized national economy severely and shall be treated strictly. However, driven by huge benefits, smuggling manners have been constantly renewing, smuggling methods become more and more secrete, and difficulties in collecting evidence and certification during smuggling and drug inspection processes are higher and higher. For example, in contraband smuggling crimes, the suspect usually hides the contraband in the luggage for convenience of escaping. When the suspect found there is something wrong with the luggage, the suspect tends to give up the luggage and leave, therefore, it is necessary to attach concealed marks on the luggage when a customs inspector finds a piece of susceptible luggage, and catch the suspect when the suspect comes to claim the luggage.

Currently, infrared luminescent materials have not yet been used in senseless customs clearance field, absorption cross sections of infrared luminescent materials currently available are not big enough, and upconversion luminescence intensity thereof is low, as a result, the luminescent marks are not clear enough to recognize marked susceptible luggage.

SUMMARY OF THE INVENTION

A purpose of the present invention is to address the problem explained in the background art, that is, infrared luminescent materials have not been used in senseless customs clearance field, absorption cross sections of infrared luminescent materials currently available are not big enough, and upconversion luminescence intensity thereof is low, as a result, the luminescent marks are not clear enough to recognize marked abnormal luggage, and provide preparation of concealed marks with core-shell luminosphores for customs security check system and application thereof.

To realize the foregoing purpose, the present invention adopts the following technical solution:

Preparation of concealed mark with core-shell luminosphores for customs security check system and application thereof, comprising following steps:

Step 1: preparing $TiQ_2$: dripping $TiCl_4$ into de-ionized water to be a mixture, dripping a solution containing ammonium sulfate and concentrated hydrochloric acid into the mixture, and stirring at 15° C., wherein an ion concentration ratio is $Ti^{4+}:H^+:SO_4^{2-}=15:1:30$, heating the mixture at 10° C./min until 95° C. after fully mixing and dissolving, keeping for an hour, adding an appropriate amount of $NH_4OH$ solution, adjusting a pH value to be 5~7, cooling to be consistent with ambient temperature, centrifuging for 10 min at 4500 r/min, cleaning a precipitate with de-ionized water and ethanol for three times and drying in a vacuum drying oven 80° C. for 10 h;

Step 2: preparing Ag@$TiO_2$ composite nanoparticles: immersing the $TiO_2$ prepared in step 1 to a silver nitrate solution with a concentration of 0.001~0.005 mol/L, irradiating with a high-voltage mercury lamp (100 W) for 3~9 h, washing three times with high purity water and ethanol, drying and calcining for 3 h in a 450° C. muffle furnace for subsequent use;

Step 3: preparing Ag@$TiQ_2$@$NaYF_4$:$Yb^{3+}$, $Er^{3+}$ luminescent nanoparticles: taking rare earth nitrate solution $Y(NO_3)_3 \cdot 6H_2O$, Yb $(NO_3)_3 \cdot 5H_2O$, Er $(NO_3)_3 \cdot 5H_2O$ and mixing, doping Lanthanide ions with a concentration of a molar ratio of $Y^{3+}:Yb^{3+}:Er^{3+}=80:18:2$, adding the Ag@$TiO_2$ composite nanoparticles during mixing, adding a certain amount of NaF after mixing, mixing for 25 min on a magnetic mixer, heating in a water bath until 90° C., keeping for 2 h, cooling and centrifuging for 10 min at 8000 r/min, washing a precipitate with de-ionized water and ethanol for three times, putting subsided raw materials into a 60° C. vacuum drying oven to dry for 12 h and get the Ag@$TiQ_2$@$NaYF_4$:$Yb^{3+}$, $Er^{3+}$ luminescent nanoparticles.

Step 4: making concealed luggage marks: dissolving Ag@$TiO_2$@$NaYF_4$:$Yb^{3+}$, $Er^{3+}$ nano-luminescence materials into an ethanol solution, spraying over a luggage tag with a spraying gun and forming a predetermined pattern; no marks will be reserved on the luggage in several seconds after solvent volatilization, so concealed marks are formed.

Preferably, an application of the concealed marks with core-shell luminosphores for customs security check system comprises following steps:

Step 1: dissolving the prepared Ag@$TiO_2$@$NaYF_4$:$Yb^{3+}$, $Er^{3+}$ nano-luminescence materials into an ethanol solution, and spraying over the luggage tag with a spraying gun to form a predetermined pattern;

Step 2: in several seconds, no marks are visible on the luggage tag after solvent volatilization, so concealed marks are formed;

Step 3: scanning tag information of check-in luggage with the security check system, and identifying an owner of the luggage;

Step 4: searching a position and a movement direction of the owner by facial recognition of a monitoring system and monitoring the same in real time;

Step 5: the owner cannot perceive any danger during claiming the luggage and becomes relaxed, and when the tag passes a security door equipped with a 980 nm laser, infrared luminescent materials on a surface of the tag will absorb near infrared light and irradiate visible light of the predetermined pattern; and Step 6: the security door sends warning signals automatically after detecting irregularity, and security staff will bring the suspect and the luggage to a security check room for further security check.

Preferably, in step 1, the spraying gun is embodied invisibly in a luggage checking device, and can be used to spray luminescent materials on the luggage tag, or spray directly on the luggage to form the concealed marks.

Preferably, for the check-in luggage, before entering the luggage checking device, the security staff attaches a tag corresponding to personal information, and enters the luggage checking device for checking, when detecting luggage containing contraband, spraying the concealed marks and scanning the tag corresponding to personal information on the luggage, and identifying the suspect; for carry-on luggage, when passing the luggage checking device, when susceptible luggage is detected, spraying the concealed marks over the luggage.

Preferably, conducting full-range facial recognition by the monitoring system deployed in a customs house or a station according to information of the suspect identified by the security check system, addressing the suspect and comparing with one who claims the luggage for double check.

Preferably, patterns of the concealed marks are categorized by species of the contraband, and making different patterns according to dangerous degree of the same species of contraband so as to provide the concealed marks with hierarchical display of dangerous degree.

Preferably, in step 3, a rate of the contraband in the luggage can be seen directly according to characteristics of the patterns exposed by the security door, so as to help to assign inspection personnel and prepare subsequent actions quickly in subsequent luggage inspection.

Compared with the prior art, the present invention has following beneficial effects:
1. By spraying the luminescent materials on the luggage to form concealed tags, and luggage scanning and facial recognition of the security check system, preparation of concealed marks with core-shell luminosphores for customs security check system and application thereof according to the present invention can identify corresponding persons, and avoid deceiving by imposters, which is conducive to deploy a full coverage security check.
2. The preparation upconverts a core-shell structure with precious metal Ag as core, $TiO_2$ made by hydrolysis as an isolating layer; and $NaYF_4:Yb^{3+}, Er^{3+}$ as shell to be luminescent nano-materials, combines plasma resonance effects of the precious metal and good upconverting luminescene characteristics of rare earth ions, and not only water-solubility of the luminosphores composited in this way is improved, but also the luminosphores can be disseminated in organic reagents such as ethanol and methanol etc. to form concealed marks for marking susceptible luggage, and provides a direction for researches on senseless customs clearance, intelligent customs clearance and safe customs clearance.

BRIEF DESCRIPTION OF THE DRAWINGS

FIG. 1 is a flowchart diagram showing an application of the concealed marks with core-shell luminosphores for customs security check system according to the present invention.

EMBODIMENTS

To make purposes, technical solutions and advantages of the present invention more clear and apparent, hereinafter a further detailed description will be given to the present invention based on embodiments thereof. It should be understood that, the embodiment described here are only to explain rather than limit the present invention.

As shown in FIG. 1, the present invention adopts the following technical solution:

Embodiment 1

Preparation of concealed mark with core-shell luminosphores for customs security check system comprises following steps:

Step 1: preparing $TiQ_2$: dripping $TiCl_4$ into de-ionized water to be a mixture, dripping a solution containing ammonium sulfate and concentrated hydrochloric acid into the mixture, and stirring at 15° C., wherein an ion concentration ratio is $Ti^{4+}:H^+:S_4^{2-}=15:1:30$, heating the mixture at 10° C./min until 95° C. after fully mixing and dissolving, keeping for an hour, adding an appropriate amount of $NH_4OH$ solution, adjusting a pH value to be 5, cooling to be consistent with ambient temperature, centrifuging for 10 min at 4500 r/min, cleaning a precipitate with de-ionized water and ethanol for three times and drying in a vacuum drying oven 80° C. for 10 h;

Step 2: preparing Ag@$TiO_2$ composite nanoparticles: immersing the $TiO_2$ prepared in step 1 to a silver nitrate solution with a concentration of 0.001 mol/L, irradiating with a high-voltage mercury lamp (100 W) for 3 h, washing three times with high purity water and ethanol, drying and calcining for 3 h in a 450° C. muffle furnace for subsequent use;

Step 3: preparing Ag@$TiQ_2$@$NaYF_4:Yb^{3+}, Er^{3+}$ luminescent nanoparticles: taking rare earth nitrate solution $Y(NO_3)_3 \cdot 6H_2O$, $Yb(NO_3)_3 \cdot 5H_2O$, $Er(NO_3)_3 \cdot 5H_2O$ and mixing, doping Lanthanide ions with a concentration of a molar ratio of $Y^{3+}:Yb^{3+}:Er^{3+}=80:18:2$, adding the Ag@$TiO_2$ composite nanoparticles during mixing, adding a certain amount of NaF after mixing, mixing for 25 min on a magnetic mixer, heating in a water bath until 90° C., keeping for 2 h, cooling and centrifuging for 10 min at 8000 r/min, washing a precipitate with de-ionized water and ethanol for three times, putting subsided raw materials into a 60° C. vacuum drying oven to dry for 12 h and get the Ag@$TiQ_2$@$NaYF_4:Yb^{3+}, Er^{3+}$ luminescent nanoparticles.

Step 4: making concealed luggage marks: dissolving Ag@$TiO_2$@$NaYF_4:Yb^{3+}, Er^{3+}$ nano-luminescence materials into an ethanol solution, spraying over a luggage tag with a spraying gun and forming a predetermined pattern; no marks will be reserved on the luggage in several seconds after solvent volatilization, so concealed marks are formed.

Preferably, an application of the concealed marks with core-shell luminosphores for customs security check system comprises following steps:

Step 1: dissolving the prepared Ag@$TiO_2$@$NaYF_4:Yb^{3+}, Er^{3+}$ nano-luminescence materials into an ethanol solution, and spraying over the luggage tag with a spraying gun to form a predetermined pattern;

Step 2: in several seconds, no marks are visible on the luggage tag after solvent volatilization, so concealed marks are formed;

Step 3: scanning tag information of check-in luggage with the security check system, and identifying an owner of the luggage;

Step 4: searching a position and a movement direction of the owner by facial recognition of a monitoring system and monitoring the same in real time;

Step 5: the owner cannot perceive any danger during claiming the luggage and becomes relaxed, and when the tag passes a security door equipped with a 980 nm laser, infrared luminescent materials on a surface of the tag will absorb near infrared light and irradiate visible light of the predetermined pattern; and Step 6: the security door sends warning signals automatically after detecting irregularity, and security staff will bring the suspect and the luggage to a security check room for further security check.

Preferably, in step 1, the spraying gun is embodied invisibly in a luggage checking device, and can be used to spray luminescent materials on the luggage tag, or spray directly on the luggage to form the concealed marks.

Preferably, for the check-in luggage, before entering the luggage checking device, the security staff attaches a tag corresponding to personal information, and enters the luggage checking device for checking, when detecting luggage containing contraband, spraying the concealed marks and scanning the tag corresponding to personal information on the luggage, and identifying the suspect; for carry-on luggage, when passing the luggage checking device, when susceptible luggage is detected, spraying the concealed marks over the luggage.

Preferably, conducting full-range facial recognition by the monitoring system deployed in a customs house or a station according to information of the suspect identified by the security check system, addressing the suspect and comparing with one who claims the luggage for double check.

Preferably, patterns of the concealed marks are categorized by species of the contraband, and making different patterns according to dangerous degrees of the same species of contraband so as to provide the concealed marks with hierarchical display of the dangerous degrees.

Preferably, in step 3, a rate of the contraband in the luggage can be seen directly according to characteristics of the patterns exposed by the security door, so as to help to assign inspection personnel and prepare subsequent actions quickly in subsequent luggage inspection.

Embodiment 2

Preparation of concealed mark with core-shell luminosphores for customs security check system comprises following steps:

Step 1: preparing $TiQ_2$: dripping $TiCl_4$ into de-ionized water to be a mixture, dripping a solution containing ammonium sulfate and concentrated hydrochloric acid into the mixture, and stirring at 15° C., wherein an ion concentration ratio is $Ti^4:H^+:SO_4^2=15:1:30$, heating the mixture at 10° C./min until 95° C. after fully mixing and dissolving, keeping for an hour, adding an appropriate amount of $NH_4OH$ solution, adjusting a pH value to be 6, cooling to be consistent with ambient temperature, centrifuging for 10 min at 4500 r/min, cleaning a precipitate with de-ionized water and ethanol for three times and drying in a vacuum drying oven 80° C. for 10 h;

Step 2: preparing $Ag@TiO_2$ composite nanoparticles: immersing the $TiO_2$ prepared in step 1 to a silver nitrate solution with a concentration of 0.003 mol/L, irradiating with a high-voltage mercury lamp (100 W) for 6 h, washing three times with high purity water and ethanol, drying and calcining for 3 h in a 450° C. muffle furnace for subsequent use;

Step 3: preparing $Ag@TiQ_2@NaYF_4:Yb^{3+}$, $Er^{3+}$ luminescent nanoparticles: taking rare earth nitrate solution $Y(NO_3)_3.6H_2O$, $Yb (NO_3)_3.5H_2O$, $Er (NO_3)_3.5H_2O$ and mixing, doping Lanthanide ions with a concentration of a molar ratio of $Y^{3+}:Yb^{3+}:Er^{3+}=80:18:2$, adding the $Ag@TiO_2$ composite nanoparticles during mixing, adding a certain amount of NaF after mixing, mixing for 25 min on a magnetic mixer, heating in a water bath until 90° C., keeping for 2 h, cooling and centrifuging for 10 min at 8000 r/min, washing a precipitate with de-ionized water and ethanol for three times, putting subsided raw materials into a 60° C. vacuum drying oven to dry for 12 h and get the $Ag@TiQ_2@NaYF_4:Yb^{3+}$, $Er^{3+}$ luminescent nanoparticles.

Step 4: making concealed luggage marks: dissolving $Ag@TiO_2@NaYF_4:Yb^{3+}$, $Er^{3+}$ nano-luminescence materials into an ethanol solution, spraying over a luggage tag with a spraying gun and forming a predetermined pattern; no marks will be reserved on the luggage in several seconds after solvent volatilization, so concealed marks are formed; the owner cannot perceive any danger during claiming the luggage and becomes relaxed, and when the tag passes a security door equipped with a 980 nm laser, infrared luminescent materials on a surface of the tag will absorb near infrared light and irradiate visible light of the predetermined pattern; and the security door sends warning signals automatically after detecting irregularity, and security staff will bring the suspect and the luggage to a security check room for further security check.

Embodiment 3

Preparation of concealed mark with core-shell luminosphores for customs security check system comprises following steps:

Step 1: preparing $TiQ_2$: dripping $TiCl_4$ into de-ionized water to be a mixture, dripping a solution containing ammonium sulfate and concentrated hydrochloric acid into the mixture, and stirring at 15° C., wherein an ion concentration ratio is $Ti^4:H^+:SO_4^2=15:1:30$, heating the mixture at 10° C./min until 95° C. after fully mixing and dissolving, keeping for an hour, adding an appropriate amount of $NH_4OH$ solution, adjusting a pH value to be 7, cooling to be consistent with ambient temperature, centrifuging for 10 min at 4500 r/min, cleaning a precipitate with de-ionized water and ethanol for three times and drying in a vacuum drying oven 80° C. for 10 h;

Step 2: preparing $Ag@TiO_2$ composite nanoparticles: immersing the $TiO_2$ prepared in step 1 to a silver nitrate solution with a concentration of 0.005 mol/L, irradiating with a high-voltage mercury lamp (100 W) for 9 h, washing three times with high purity water and ethanol, drying and calcining for 3 h in a 450° C. muffle furnace for subsequent use;

Step 3: preparing $Ag@TiQ_2@NaYF_4:Yb^{3+}$, $Er^{3+}$ luminescent nanoparticles: taking rare earth nitrate solution $Y(NO_3)_3.6H_2O$, $Yb (NO_3)_3.5H_2O$, $Er (NO_3)_3.5H_2O$ and mixing, doping Lanthanide ions with a concentration of a molar ratio of $Y^{3+}:Yb^{3+}:Er^{3+}=80:18:2$, adding the $Ag@TiO_2$ composite nanoparticles during mixing, adding a certain amount of NaF after mixing, mixing for 25 min on a magnetic mixer, heating in a water bath until 90° C., keeping for 2 h, cooling and centrifuging for 10 min at 8000 r/min, washing a precipitate with de-ionized water and ethanol for three times, putting subsided raw materials into a 60° C. vacuum drying oven to dry for 12 h and get the $Ag@TiQ_2@NaYF_4:Yb^{3+}$, $Er^{3+}$ luminescent nanoparticles.

Step 4: making concealed luggage marks: dissolving $Ag@TiO_2@NaYF_4:Yb^{3+}$, $Er^{3+}$ nano-luminescence materials into an ethanol solution, spraying over a luggage tag with a spraying gun and forming a predetermined pattern; no marks will be reserved on the luggage in several seconds after solvent volatilization, so concealed marks are formed; the owner cannot perceive any danger during claiming the luggage and becomes relaxed, and when the tag passes a security door equipped with a 980 nm laser, infrared luminescent materials on a surface of the tag will absorb near infrared light and irradiate visible light of the predetermined pattern; and the security door sends warning signals automatically after detecting irregularity, and security staff will bring the suspect and the luggage to a security check room for further security check.

Above all, samples obtained in the foregoing embodiment 1, embodiment 2 and embodiment 3 have been sent for an fluorescence spectrum analysis, and it turned out that, under 980 nm laser, when adjusting the pH value in step 1 to be 5, 6 and 7, and the molar ratio of concentration of Lanthanide ions $Y^{3+}:Yb^{3+}:Er^{3+}=80:18:2$, fluorescence intensity of the $Ag@TiQ_2@NaYF_4:Yb^{3+}, Er^{3+}$ luminescent nanoparticles is high, visually perceivable green strong light has been irradiated, and upconverting luminescent effects are effective. Adding the samples obtained in embodiment 1, embodiment 2 and embodiment 3 into a colorimetric tube, adding water until 100 ml, capping the same, mixing evenly, taking the colorimetric tube 30 minutes later and putting on a black background together with another colorimetric tube with $NaYF_4:Yb^{3+}, Er^{3+}$ luminescent nanoparticles and filling water until 100 ml, it turned out that, water-solubility of the $Ag@TiQ_2@NaYF_4:Yb^{3+}, Er^{3+}$ luminescent nanoparticles prepared according to the present invention is better. In the same manner it have been ascertained that dissemination properties of the present invention in ethanol and methanol are superior too.

The luminescent nanoparticles prepared by the preparation method of the core-shell concealed luminescent materials for customs security check system proposed by the present invention before irradiancy is of good water solubility, invisible and not perceivable after solvent volatilization, and luminescent effects after near infrared light irradiation thereof are excellent, can be used to mark susceptible luggage, and provides research directions for senseless customs clearance, intelligent customs clearance and safe customs clearance.

The above are only the preferred specific embodiments of the present invention, but the protection scope of the present invention is not limited thereto. Any equivalent replacements or modifications to the technical solutions and the inventive thoughts of the present invention made by one skilled in the art within disclosure scope of the present invention shall fall into protection scope of the present invention.

The invention claimed is:

1. Preparation of concealed marks with core-shell luminosphores for customs security check system, characterized in that, comprising following steps:

Step 1: preparing $TiQ_2$: dripping $TiCl_4$ into de-ionized water to be a mixture, dripping a solution containing ammonium sulfate and concentrated hydrochloric acid into the mixture, stirring at 15° C., wherein an ion concentration ratio is $Ti^{4+}:H^+:SO_4^{2-}=15:1:30$, heating the mixture at 10° C./min until 95° C. after fully mixing and dissolving, keeping for an hour, adding an appropriate amount of $NH_4OH$ solution, adjusting a pH value to be 5~7, cooling to be consistent with ambient temperature, centrifuging for 10 min at 4500 r/min, cleaning a precipitate with de-ionized water and ethanol for three times and drying in a vacuum drying oven 80° C. for 10 h;

Step 2: preparing $Ag@TiO_2$ composite nanoparticles: immersing the $TiO_2$ prepared in step 1 to a silver nitrate solution with a concentration of 0.001~0.005 mol/L, irradiating with a high-voltage mercury lamp (100 W) for 3~ 9 h, washing three times with high purity water and ethanol, drying and calcining for 3 h in a 450° C. muffle furnace for subsequent use;

Step 3: preparing $Ag@TiQ_2@NaYF_4:Yb^{3+}, Er^{3+}$ luminescent nanoparticles: taking rare earth nitrate solution $Y(NO_3)_3 \cdot 6H_2O$, $Yb(NO_3)_3 \cdot 5H_2O$, $Er(NO_3)_3 \cdot 5H_2O$ and mixing, doping Lanthanide ions with a concentration of a molar ratio of $Y^{3+}:Yb^{3+}:Er^{3+}=80:18:2$, adding the $Ag@TiO_2$ composite nanoparticles during mixing, adding a certain amount of NaF after mixing, mixing for 25 min on a magnetic mixer, heating in a water bath until 90° C., keeping for 2 h, cooling and centrifuging for 10 min at 8000 r/min, washing a precipitate with de-ionized water and ethanol for three times, putting subsided raw materials into a 60° C. vacuum drying oven to dry for 12 h and get the $Ag@TiQ_2@NaYF_4:Yb^{3+}, Er^{3+}$ luminescent nanoparticles, Step 4: making concealed luggage marks: dissolving $Ag@TiO_2@NaYF_4:Yb^{3+}, Er^{3+}$ nano-luminescence materials into an ethanol solution, spraying over a luggage tag with a spraying gun and forming a predetermined pattern; no marks will be reserved on the luggage in several seconds after solvent volatilization, so concealed marks are formed: wherein the application of the concealed marks with core-shell luminosphores for customs security check system characterized in that, comprising following steps:

dissolving prepared $Ag@TiQ_2@NaYF_4:Yb^{3+}, Er^{3+}$ nano-luminescence materials into an ethanol solution, and spraying over the luggage tag with the spraying gun to form the predetermined pattern;

in several seconds, no marks are visible on the luggage tag after solvent volatilization, so concealed marks are formed: and patterns of the concealed marks are categorized by species of contraband, and different patterns are made according to dangerous degrees of the same species of contraband so as to provide the concealed marks with hierarchical display of dangerous degrees, scanning tag information of check-in luggage with a security check system, and identifying an owner of the luggage; and conducting full-range facial recognition by the monitoring system deployed in a customs house or a station according to information of the suspect identified by the security check system, addressing the suspect and comparing with one who claims the luggage for double check;

searching a position and a movement direction of the owner by facial recognition of a monitoring system and monitoring the same in real time;

the owner cannot perceive any danger during claiming the luggage and becomes relaxed, and when the tag passes a security door equipped with a 980 nm laser, infrared luminescent materials on a surface of the tag will absorb near infrared light and irradiate visible light of the predetermined pattern; and the security door sends warning signals automatically after detecting irregularity, and security staff will bring the owner and the luggage to a security check room for further security check.

2. Preparation of the concealed marks with core-shell luminosphores for customs security check system according to claim 1, characterized in that, in step 1, the spraying gun is embodied invisibly in a luggage checking facility, and is used to spray luminescent materials on the luggage tag, or spray directly on the luggage to form the concealed marks.

3. Preparation of of the concealed marks with core-shell luminosphores for customs security check system according to claim 1, characterized in that, for the check-in luggage, before entering the luggage checking facility, the security staff attaches a tag corresponding to personal information, and enters the luggage checking facility for checking, which when detecting contraband containing luggage, sprays the concealed marks and scans the tag corresponding to personal information on the luggage, and identifies a suspect; for carry-on luggage, when passing the luggage checking facility, when susceptible luggage is detected, spraying the concealed marks over the luggage.

4. Preparation of the concealed marks with core-shell luminosphores for customs security check system according to claim 1, characterized in that, in step 3, a rate of contraband in the luggage can be seen directly according to characteristics of the patterns exposed by the security door, so as to help to assign inspection personnel and prepare subsequent actions quickly in subsequent luggage inspection.

* * * * *